July 15, 1941. H. C. GRANT, JR Re. 21,856
SOUND RECORDING AND REPRODUCING APPARATUS
Original Filed Jan. 16, 1939
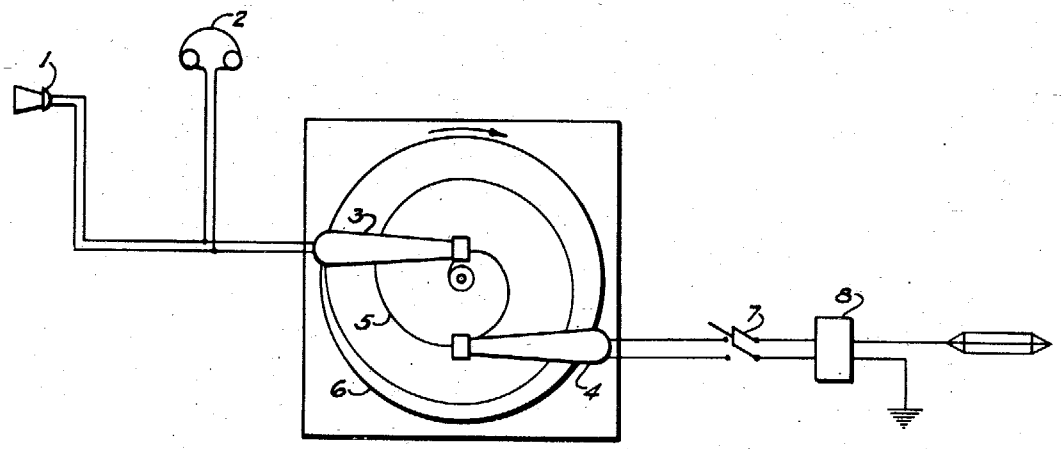
HARRY C. GRANT, JR.
INVENTOR
BY J. William Carson
ATTORNEY Reissued July 15, 1941

Re. 21,856

UNITED STATES PATENT OFFICE 21,856

SOUND RECORDING AND REPRODUCING APPARATUS

Harry C. Grant, Jr., New York, N. Y.

Original No. 2,201,614, dated May 21, 1940, Serial No. 251,085, January 16, 1939. Application for reissue November 13, 1940, Serial No. 365,557

6 Claims. (Cl. 179—100.4)

The present invention relates to sound recording and reproducing apparatus, and while the following description is particularly directed to radio broadcasting apparatus of the type employing disc sound recording apparatus for recordation of the broadcast before it is projected on the air lanes, the invention is nevertheless applicable to other types of sound recording and reproducing apparatus, such as film type sound recording apparatus.

In radio broadcasting it is often necessary or desirable to broadcast unrehearsed programs; but this usually causes great concern to the broadcasting station since objectionable statements or words may be made and broadcast without any opportunity of removing the objectionable matters, since there is no appreciable time delay between the reception of the originating sound by the microphone and transmission as radiant energy. The only control the broadcasting station has in transmitting unrehearsed programs is based on their judgment of the persons who are to do the broadcasting.

It is accordingly an object of the present invention to provide in a sound recording and reproducing apparatus, means whereby a suitable time delay is created between the reception of the originating sound by the microphone and transmission as radiant energy, so that a "censor operator" may prevent the actual radio transmission of any objectionable matter, but at the same time providing a sufficiently short delay which cannot be apparent or in any event objectionable to the radio listener.

Referring to the drawing, the reference numeral 1 is a conventional radio microphone connected to a conventional voice recorder cutter 3 actuated, directly or indirectly, by electrical impulses set up through the microphone 1, 2 is any convenient listening phone for the radio censor, 4 is a conventional pickup unit which converts the impulses recorded in the sound track 5, directly or indirectly, into electrical impulses which will reproduce the original sound in a radio receiver, when these impulses are used to control the radio transmitter 8, which is connected to the pickup unit 4 through the cut-out switch 7, which is convenient to the "censor operator" listening in the phones 2. Any conventional recording disc 6 designed for use with the cutter 3 and pickup 4 is rotated as required, so that the cutter 3 may cut a recording sound track 5, while the pickup 4 is reproducing that portion of the sound track that has been cut by the cutter 3 at some time previous. The time interval between the cutting of the sound track by the cutter 3 and the reproduction thereof by the pickup 4 may be set at any desired amount, say about three seconds.

It should be understood that the various parts essential to this invention may be located closely adjacent one another or remotely, with the exception that the listening phones 2 and the cut-out switch 7 are adjacent, as previously mentioned.

In the operation of the above described apparatus, voice or other sound waves actuate the microphone 1, which in turn, possibly through conventional amplifiers, causes the cutter 3 to cut an appropriate record on the disc 6. The control or censor operator hears these original sounds almost immediately. At some preset interval later, say about three seconds, the pickup 4, actuated by the sound track 5 on the disc 6, causes the broadcast transmitter to transmit radio energy, suitably modulated, to cause any tuned radio receiver to reproduce the original sounds. If, however, the microphone 1 picks up any matter which may be considered as not suitable for broadcasting, the "censor operator" opens the cut-out switch 7, preventing the undesired sound waves from actuating the broadcasting transmitter. When the originating sounds are again considered acceptable for broadcasting, the operator waits for the time interval, as set between the recording by the cutter 3 and the pickup by 4, to elapse, and then closes the switch 7 to restore the normal broadcasting.

The cut-out switch may also be arranged to start a time switch when the switch 7 is opened, in order that the switch 7 may be closed again the instant that acceptable matter is again heard in the phones 2, the time switch being arranged to keep the circuit open between the pickup 4 and the transmitter 8 until a time interval has elapsed, equal to or slightly longer than the interval between the recording by 3 and the pickup by 4.

While my invention has been described with specific reference to radio broadcasting apparatus of the type employing disc sound recording apparatus, it will be understood by those skilled in the art that the invention resides in certain broad principles of construction and operation which may be embodied in various types of radio broadcasting apparatus and other sound recording and reproducing apparatus without in any way departing from the spirit and scope of the invention; and I accordingly do not wish my invention to be limited, save as defined in the appended claims.

I claim:

1. In a sound recording and reproducing apparatus the combination with sound recording and sound reproducing circuits of means for reproducing a portion of the sound record at a predetermined time interval after the recording thereof, listening means in the recording circuit to enable a supervising operator to listen to the sounds being recorded, and means in the reproducing circuit to enable the supervising operator to open the same to cut off the reproduction of objectionable sounds detected by the listening means before such objectionable sounds have been reproduced.

2. In a sound recording and reproducing apparatus the combination with sound recording and sound reproducing circuits of means for recording sounds on a sound record, means for reproducing any portion of the sound record at a predetermined time interval after the recording thereof, listening means in the recording circuit to enable a supervising operator to listen to the sounds being recorded, and means in the reproducing circuit to enable the supervising operator to open the same to cut off the reproduction of objectionable sounds detected by the listening means before such objectionable sounds have been reproduced.

3. In a sound recording and reproducing apparatus the combination with sound recording and sound reproducing circuits of a sound record of the rotating disc type, a cutter for cutting a sound track on said record, means to control the cutter by sounds picked up by the recording circuit, means to reproduce any portion of the sound track at a predetermined interval after the cutting thereof, listening means in the recording circuit to enable a supervising operator to listen to the sounds being recorded, and means in the reproducing circuit to enable the supervising operator to open the same to cut off the reproduction of objectionable sounds detected by the listening means before such objectionable sounds have been reproduced.

4. A sound censoring apparatus adapted to record originating sound sequences and reproduce them at a predetermined but relatively short time interval after the recording thereof comprising sound pickup and sound reproducing circuits, means for producing a sound record of sounds received through the sound pickup circuit, means for reproducing a portion of the sound record at a predetermined but relatively short time interval after the recording thereof and while subsequent portions of the originating sound sequence are still in the course of being initially recorded, and means in the reproducing circuit to enable a supervising operator listening to such sounds before their reproduction to open the reproducing circuit to cut off the reproduction of objectionable sounds.

5. A sound censoring apparatus adapted to record originating sound sequences and reproduce them at a predetermined but relatively short time interval after the recording thereof comprising sound pickup and sound reproducing circuits, a sound record of the rotating disc type, a cutter for cutting a sound track on said record, means to control the cutter by sounds received through the sound pickup circuit, means for reproducing any portion of the sound track at a predetermined but relatively short time interval after the cutting thereof and while subsequent portions of the originating sound sequence are still in the course of being initially recorded, and means in the reproducing circuit to enable a supervising operator listening to such sounds before their reproduction to open the reproducing circuit to cut off the reproduction of objectionable sounds.

6. A sound censoring apparatus adapted to record originating sound sequences and reproduce them at a predetermined but relatively short time interval after the recording thereof comprising sound pickup and sound reproducing circuits, means for producing a sound record of sounds received through the sound pickup circuit, means for reproducing a portion of the sound record at a predetermined but relatively short time interval after the recording thereof and while subsequent portions of the originating sound sequence are still in the course of being initially recorded, and means to enable a supervising operator listening to such sounds before their reproduction to prevent the reproduction of objectionable sounds.

HARRY C. GRANT, JR.